United States Patent [19]

Parrish et al.

[11] 4,406,221
[45] Sep. 27, 1983

[54] BALE RETAINER FOR ROLL BALING MACHINE

[75] Inventors: Charles A. Parrish; John H. Freimuth, both of New Holland; Willis R. Campbell, Ephrata; Anthony F. Diederich, Jr., Terre Hill; James T. Clevenger, Jr., Lancaster, all of Pa.

[73] Assignee: Sperry Corporation, New Holland, Pa.

[21] Appl. No.: 348,485

[22] Filed: Feb. 12, 1982

[51] Int. Cl.³ .............................................. B30B 5/06
[52] U.S. Cl. ...................................... 100/88; 56/341
[58] Field of Search .................................. 100/88, 89; 56/341–344

[56] References Cited

U.S. PATENT DOCUMENTS

| 3,901,007 | 8/1975 | Blanshine et al. | 56/341 |
| 4,206,587 | 6/1980 | Freimuth et al. | 56/341 |
| 4,375,187 | 3/1983 | Kluver | 100/88 |

*Primary Examiner*—Peter Feldman
*Attorney, Agent, or Firm*—Darrell F. Marquette; Larry W. Miller; Frank A. Seemar

[57] ABSTRACT

A roll baling machine includes an apron supported on a base frame and movable in suitable manner to form roll bales of crop material. A bale retainer is mounted on the base frame to momentarily hold a roll bale upward in the base frame during its discharge therefrom. The bale retainer is movable from an inoperative position during bale formation to an operative position during discharge of a roll bale from the base frame.

11 Claims, 3 Drawing Figures

BALE RETAINER FOR ROLL BALING MACHINE

This invention relates generally to roll baling machines typically referred to as "round balers" which form cylindrical roll bales of crop material.

The present invention provides a roll baling machine including a base frame, bale forming means supported on the base frame cooperating with the floor roller means for forming a roll bale of crop material, and bale retainer means mounted on the base frame for momentarily holding a roll bale upward in the base frame during its discharge from the base frame. The bale retainer means is movable between an inoperative position during bale formation and an operative position during discharge of a roll bale from the base frame. A particular form of the bale retainer means comprises a transverse member extending transversely of the base frame on which a roll bale will momentarily rest during its discharge from the base frame, support members rotatably mounted on the base frame supporting the transverse member, and springs connected between the base frame and the support members normally urging the bale retainer means toward the operative position. The roll baling machine of the present invention may also include bale kicker means mounted on the base frame for contacting a roll bale upon its discharge from the base frame and propelling it rearwardly of the base frame. The bale retainer means then serves to properly dispose the roll bale on the bale kicker means.

DESCRIPTION OF THE PREFERRED EMBODIMENT

Figure 1:
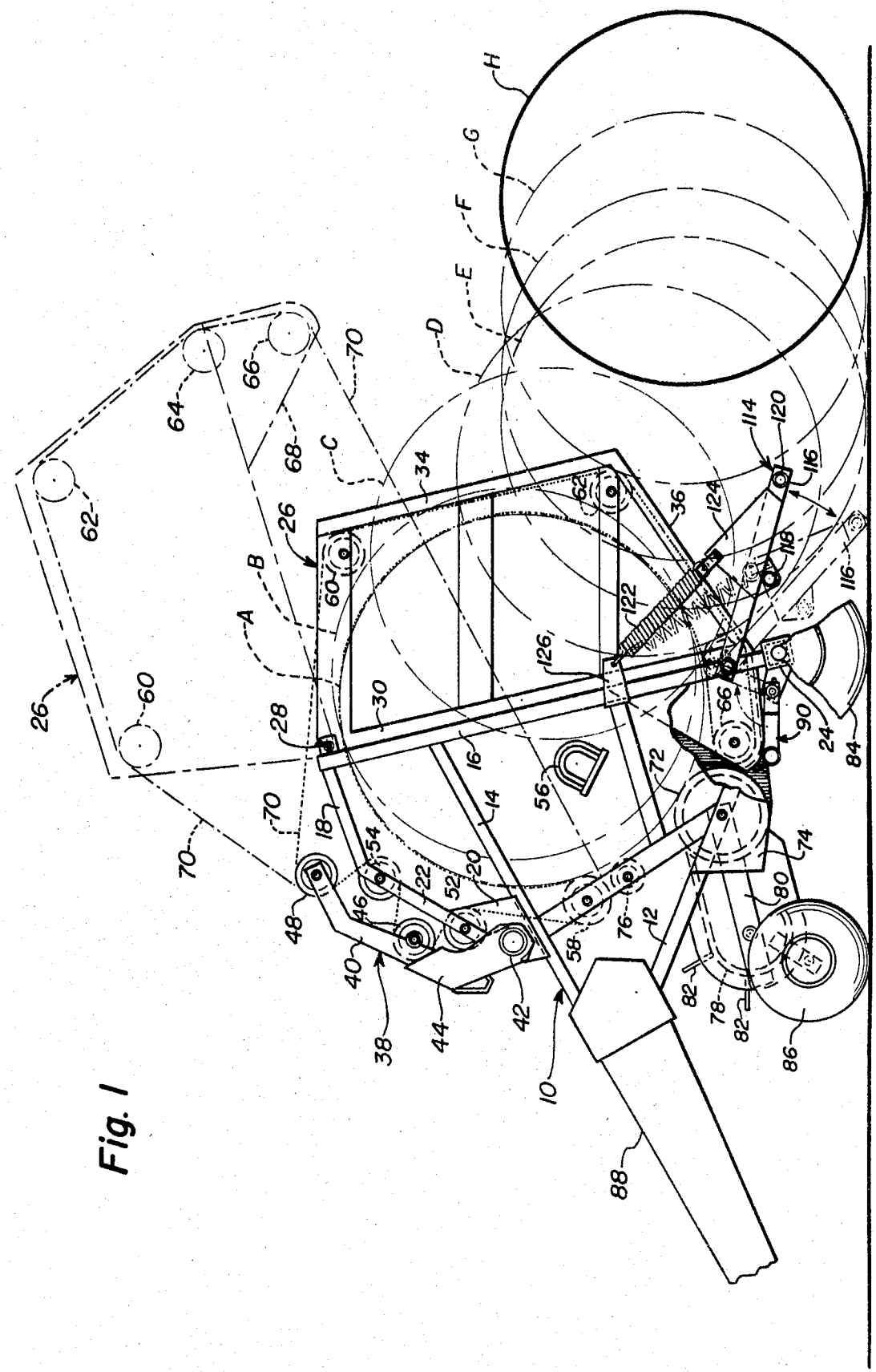
FIG. 1 is a side elevation view of a roll baling machine embodying the preferred embodiment of the bale retainer of the present invention.

Referring to FIG. 1, the roll baling machine embodying the preferred embodiment of the present invention includes a base frame 10 having opposite sides each formed generally of frame members 12,14,16 rigidly connected in a triangular configuration with side plates substantially covering the space therebetween. Each side of the base frame 10 includes an upper section, which consists of a frame member 18 rigidly connected to the frame member 16, a bracket 20 rigidly connected to frame member 14, and a frame member 22 rigidly connected between the frame member 18 and the bracket 20. A plate is connected to and covers the space between the frame members 14,16,18 and 22. A frame member 24 extends transversely of the machine and is rigidly connected to the frame members 16. A rear frame 26 is pivotally connected at 28 to the base frame 10 by suitable bearings. The rear frame 26 has opposite sides each formed generally of frame members 30,32,34,36 rigidly connected in a substantially trapezoidal configuration with side plates substantially covering the space therebetween. Other frame members (not shown) extend transversely of the machine and connect the opposite sides of the base frame 10 and the opposite sides of the rear frame 26. In FIG. 1, the forward end of the machine is to the left and the rearward end thereof is to the right.

The rear frame 26 is pivotally movable from the lower position shown in full lines in FIG. 1 to an upper position shown in phantom by conventional means such as hydraulic cylinders (not shown) mounted at the sides of the machine and connected between the base frame 10 and the rear frame 26.

An arm assembly 38 is rotatably mounted on the base frame 10 for rotational movement between a forward position (not shown) and a rearward position shown in FIG. 1. The arm assembly 38 includes arms 40 disposed inboard the sides of the machine. The arms 40 are rigidly connected to a cross tube 42 by bracket members 44. The cross tube 42 is rotatably mounted in suitable bearing members carried by the brackets 20 on the opposite sides of the base frame 10. The arm assembly 38 is normally urged toward its forward position preferably by conventional means such as extension or compression springs (not shown) connected between the arm assembly 38 and the base frame 10.

The arm assembly 38 carries rotatable guide members 46 and 48 on its arms 40. The base frame 10 supports rotatable guide members 52,54 and cam guide members 56 inboard its opposite sides. Preferably, the cam guide members 56 are of the known type disclosed in U.S. Pat. No. 3,901,007 and designated therein by the numeral "118". Sprockets 58 are provided inboard the opposite sides of the base frame 10 and are fixed on a shaft that is rotatably mounted in suitable bearings on the base frame 10. The rear frame 26 supports rotatable guide members 60,62,64,66 inboard its opposite sides. The guide members 66 are carried on brackets 68 projecting from the frame members 30 of the rear frame 26.

A flexible bale forming apron 70 is movably supported on the aforementioned guide members and sprockets. The apron 70 is preferably formed of a pair of endless link-type chains connected at spaced intervals by transverse bars or slats. The apron chains 70 extend around and engage the various guide members and the sprockets 58. This apron 70 is of the known type disclosed in U.S. Pat. No. 3,901,007 and designated therein by the numeral "82".

A floor roller 72 extends transversely of the machine and is rotatably supported by brackets 74 on the opposite sides of the base frame 10. Preferably, the floor roller 72 consists of a hollow metal drum with a coating or layer of rubber on its outer surface. When the machine is empty, the upper surface of the floor roller 72 cooperates with a course of the apron 70 that extends upwardly and rearwardly from the guide members 66 over the cam guide members 56 and then downwardly and forwardly to the sprockets 58 to define an expandable bale chamber having an initial wedge shape (not shown) in side elevation. In this initial wedge shape, the forward end of the bale chamber is narrower than the rearward end thereof. A stripper roller 76, preferably rubber coated, extends transversely of the machine and is rotatably supported on the opposite sides of the base frame 10. The stripper roller 76 is positioned at the forward end of the bale chamber in close proximity to the apron 70.

Figure 2:
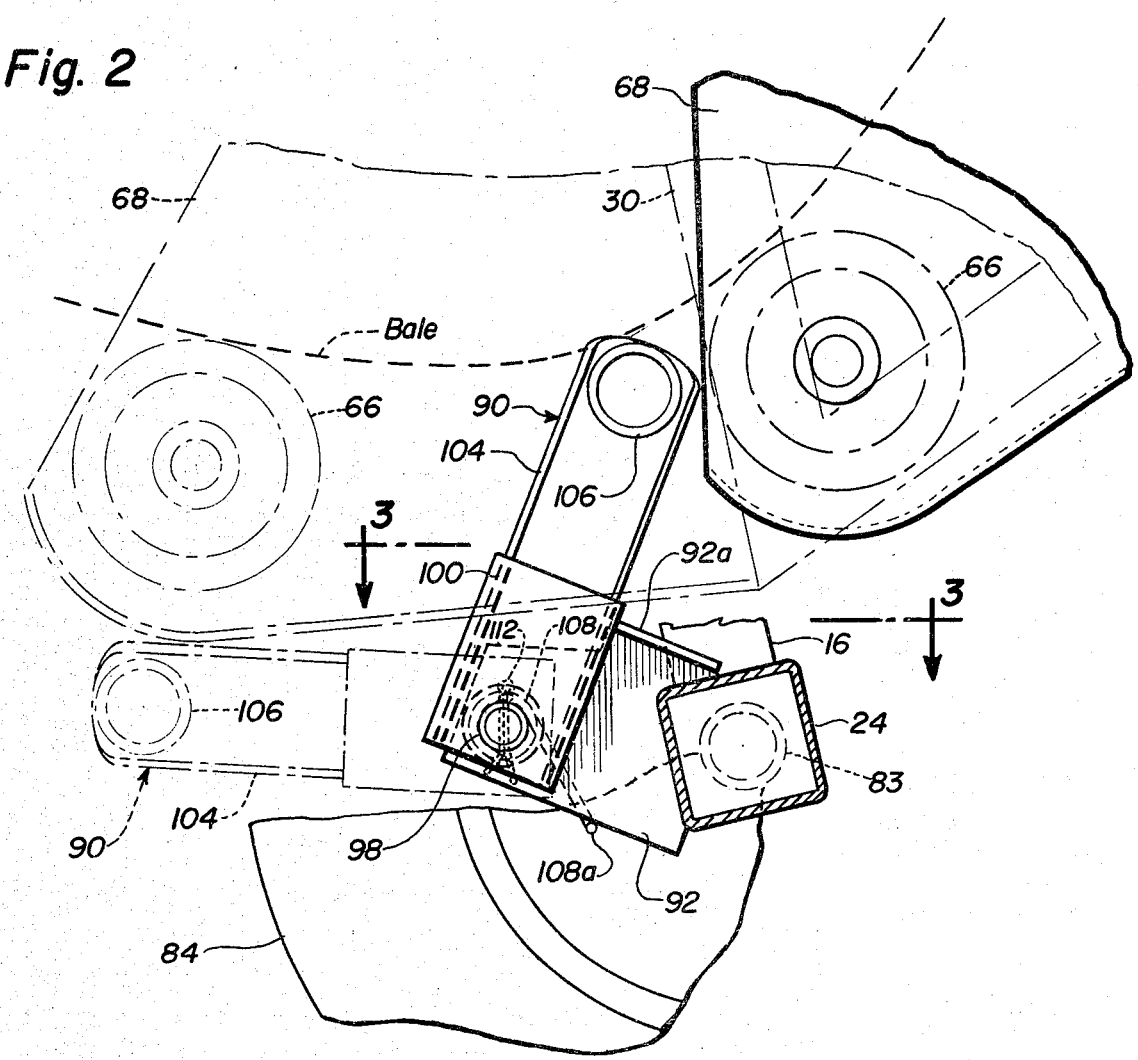
FIG. 2 is an enlarged view of a portion of the roll baling machine in FIG. 1 showing the bale retainer in the inoperative and operative positions.
Figure 3:
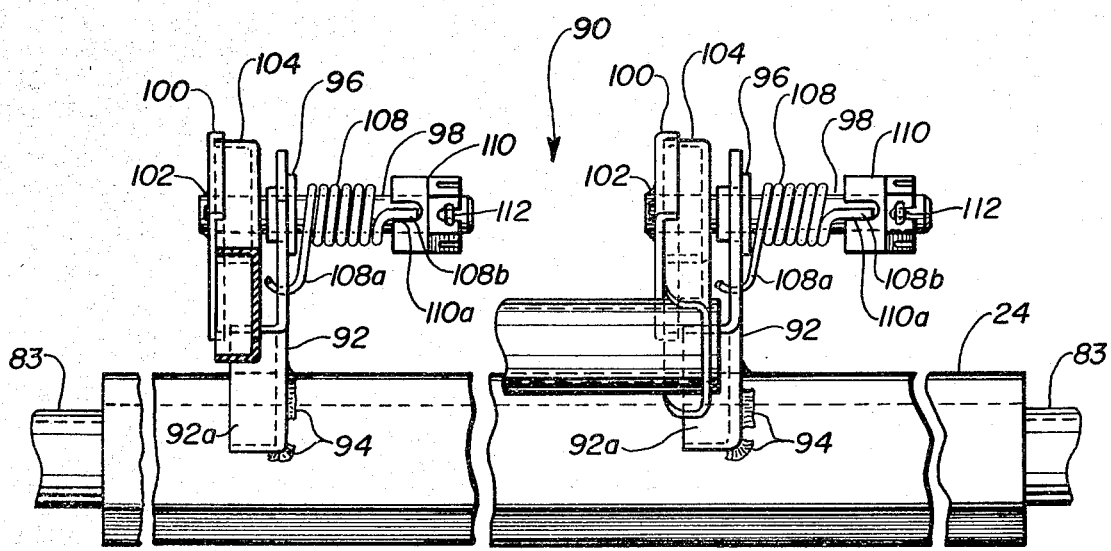
FIG. 3 is a section view taken along lines 3—3 in FIG. 2.

A pickup header 78 extends transversely of the machine and is supported by brackets 80 on the opposite sides of the base frame 10. The pickup header 78 is preferably of conventional type having a series of projecting fingers 82 for engaging and picking up windrowed crop material. A pair of wheels 84 mounted on the opposite sides of the base frame 10 support the machine. As seen in FIGS. 2 and 3, the wheels 84 are mounted on spindles 83 which are connected to the frame member 24. Another pair of wheels 86 are mounted to the brackets 80 to provide support primarily for the pickup header 78. A tongue 88 is provided on the forward end of the base frame 10 for connection to a tractor.

The machine includes drive means (not shown) adapted for connection to the power take off unit (PTO) of a tractor. Referring to FIG. 1, rotary driving power will be delivered from the tractor PTO in a known manner to cause rotation of the sprockets 58, the floor roller 72, the stripper roller 76, and the pickup header fingers 82 in the same direction. Rotation of the sprockets 58 will drive the apron chains thereby propelling the apron 70 around the various guide members in the base frame 10 and the rear frame 26 in the direction and along the path indicated. Preferably, the peripheral speed of the floor roller 72 should be equal to or slightly higher than the speed of the apron 70. This will tend to keep a roll of crop material toward the rearward end of the machine during formation.

A bale retainer 90 is pivotally mounted on the base frame 10 for movement between an inoperative position shown in full lines in FIG. 1 and an operative position shown in phantom in FIG. 1. The preferred embodiment of the bale retainer 90, as best seen in FIGS. 2 and 3, includes brackets 92 welded at 94 to the frame member 24. The brackets 92 carry bearings 96 which rotatably receive shafts 98. Plates 100 are welded at 102 to the shafts 98, and channel members 104 are rigidly connected to the plates 100 and the shafts 98. A tube 106 extends transversely between and is rigidly connected to the channel members 104. A torsion spring 108 is mounted concentrically on each shaft 98 with an end portion 108a thereof engaged under a bracket 92. A fitting 110 is received on each shaft 98 and is held thereon by a cotter pin 112. The other end portion 108b of each torsion spring 108 is engaged in a slot 110a of a fitting 110.

During assembly of the bale retainer 90, the fittings 110 are disposed on the shafts 98 engaging the end portions 108b of the torsion springs 108 and then the fittings 110 are rotated clockwise (as viewed from the right in FIG. 3) a sufficient amount to preload the torsion springs 108 before inserting the cotter pins 112. With the torsion springs 108 preloaded, the bale retainer 90 is normally urged toward the operative position shown in full lines in FIG. 2 where the channel members 104 engage flange portions 92a of the brackets 92. When the rear frame 26 is in its lower position, the brackets 68 engage the channel members 104 and hold the bale retainer 90 in the inoperative position shown in phantom in FIG. 2. As the rear frame 26 starts to move from its lower position to its upper position, the torsion springs 108 urge the bale retainer 90 into the operative position shown in full lines in FIG. 2. Alternatively, it will be understood that other means such as mechanical linkages or hydraulic cylinders may be used in lieu of the torsion springs 108 to move the bale retainer 90 into the operative position.

An optional bale kicker 114 is mounted on the base frame 10 and includes bars 116 pivotally connected to the frame members 16. Tubes 118 and 120 extend transversely between and are connected to the bars 116. Springs 122 are connected between brackets 124 which are attached to the bars 116 and brackets 126 which are attached to the frame members 16. The bale kicker 114 is normally in the position shown in full lines in FIG. 1 with the springs 122 in relaxed state. As a bale is discharged from the machine subsequent to moving the rear frame 26 to its upper position, the bale rolls onto the bale kicker 114 and pivots it downwardly to the position shown in phantom in FIG. 1 against the force of the springs 112. This causes the bale kicker 114 to propel the bale rearwardly of the machine a sufficient distance to allow the rear frame 26 to be returned to its lower position. The bale kicker 114 is of the known type disclosed in U.S. Pat. No. 4,206,587.

As the machine is pulled across a field by a tractor, the pickup header fingers 82 engage, pickup and deliver windrowed crop material onto the upper surface of the rotating floor roller 72 in the bale chamber. The crop material is carried upwardly and then coiled back downwardly onto itself by the apron 70 which in its starting position moves upwardly and rearwardly from the guide members 66 over the cam guide members 56 and then downwardly and forwardly to the sprockets 58. This movement of the apron 70 in the bale chamber effectively starts the core of the roll bale. The rotating stripper roller 76 removes crop material from the apron 70 at the forward end of the bale chamber and delivers it back downwardly into the bale chamber. The roll bale increases in diameter lifting the inner course of the apron 70 that extends between the guide members 66 and the sprockets 58 off the cam guide member 56, and expanding the bale chamber from its initial wedge shape to a substantially circular shape. The expansion of the bale chamber results in expansion of the inner course of the apron 70 contacting the peripheral surface of the roll bale and movement of the apron 70 toward its final position shown in FIG. 1. This movement of the apron 70 is accomplished by rotation of the arm assembly 38 in a clockwise direction as viewed in FIG. 1, from its forward position. When the bale reaches its maximum diameter, the apron 70 will be in its final position of FIG. 1 and the arm assembly 38 will have rotated about 65° to its rearward position shown in FIG. 1. When it is desired to discharge a bale from the machine, the rear frame 26 is raised to its upper position. This stretches the inner course of the apron 70 across the space between the guide members 66 and the sprockets 58 thereby assisting the bale to exit the machine. The bale rotates in a clockwise direction as viewed in FIG. 1 as it exits the base frame 10.

During the exiting of a bale from the base frame 10, the bale retainer 90 will be in operative position and the bale will momentarily rest on the bale retainer tube 106. This momentarily holds the bale upward in the base frame 10 and prevents the bale from dropping down onto the base frame member 24 or between the bale frame member 24 and the bale kicker tube 118. With the bale retainer 90 in operative position, the bale will roll out of the base frame 10 in a clockwise direction as viewed in FIG. 1, onto the bale kicker tubes 118, 120 pivoting the bale kicker 114 downwardly so that the bale will be propelled rearwardly of the machine. The path of the bale as it exits the machine is represented by the positions A through G shown in phantom in FIG. 1, and the final position H of the bale is shown in full lines in FIG. 1.

It should also be understood that the roll baling machine of FIG. 1 may be operated without the bale kicker 114. In such case, the bale retainer 90 momentarily holds bales upward in the base frame 10 during discharge thereby causing bales to exit the base frame 10 to a location further rearward than they would if the bale retainer 90 was removed.

The present invention is not limited to use on roll baling machines that employ the particular type of apron 78. Accordingly, the present invention may be used on roll baling machines employing other types of aprons such as the well known type of apron formed of a series of endless flat belts.

The present invention is also not limited to use on roll baling machines that have expandable bale chambers and accordingly may be used on roll baling machines that have fixed bale chambers.

The following claims are intended to cover all modifications and variations of the preferred embodiment of the invention without departing from the spirit and scope of the invention.

Having thus described the invention, what is claimed is:

1. A roll baling machine comprising:
   (a) a base frame;
   (b) bale forming means supported on said base frame for forming a roll bale of crop material;
   (c) bale retainer means mounted on said base frame for momentarily holding a roll bale upward in said base frame during its discharge from said base frame;
   (d) said bale retainer means being movable between an inoperative position during bale formation and an operative position during discharge of a roll bale from said base frame;
   (e) a rear frame pivotally connected to said base frame for movement between a lower position during bale formation and an upper position to permit discharge of a roll bale from the machine;
   (f) said bale retainer means being engaged with said rear frame in order to hold said bale retainer means in said inoperative position when said rear frame is in said lower position; and
   (g) said bale retainer means being disengaged from said rear frame in order to permit said bale retainer means to move to said operative position when said rear frame is in said upper position.

2. The roll baling machine of claim 1, wherein said bale retainer means is pivotally connected to said base frame for movement between said inoperative and operative positions.

3. The roll baling machine of claim 1, further comprising spring means normally urging said bale retainer means toward said operative position.

4. The roll baling machine of claim 1, wherein said bale retainer means comprises a transverse member extending transversely of said base frame on which a roll bale momentarily rests during its discharge from said base frame.

5. The roll baling machine of claim 4, wherein said bale retainer means further comprises support members rotatably connected to said base frame and supporting said transverse member.

6. The roll baling machine of claim 5, wherein said bale retainer means further comprises springs connected between said base frame and said support members normally urging said bale retainer means toward said operative position.

7. The roll baling machine of claim 6, further comprising a rear frame pivotally connected to said base frame, and said rear frame engaging said support members to hold said bale retainer means in said inoperative position.

8. A roll baling machine comprising:
   (a) a base frame;
   (b) floor roller means rotatably supported on said base frame;
   (c) bale forming means supported on said base frame and cooperating with said floor roller means for forming a roll bale of crop material;
   (d) bale kicker means mounted on said base frame for contacting a roll bale upon its discharge from said base frame and propelling it rearwardly of said base frame;
   (e) bale retainer means mounted on said base frame for momentarily holding a roll bale upward in said base frame during its discharge from said base frame so that it will be properly disposed on said bale kicker means; and
   (f) said bale retainer means being located between said floor roller means and said bale kicker means.

9. The roll baling machine of claim 8, wherein said bale retainer means is movable between an inoperative position during bale formation and an operative position during discharge of a roll bale from said base frame.

10. The roll baling machine of claim 9, wherein said bale retainer means comprises:
    (a) a transverse member extending transversely of said base frame on which a roll bale momentarily rests during its discharge from said base frame;
    (b) support members rotatably connected to said base frame and supporting said transverse member; and
    (c) springs connected between said base frame and said support members normally urging said bale retainer means toward said operative position.

11. The roll baling machine of claims 1 or 8, wherein said bale forming means comprises apron means including endless flexible members and transverse members extending between and interconnecting said endless flexible members.

* * * * *